US009887788B2

(12) United States Patent
Wang et al.

(10) Patent No.: US 9,887,788 B2
(45) Date of Patent: Feb. 6, 2018

(54) METHOD AND SYSTEM FOR IMPLEMENTING A LARGE AREA CONTINUOUS COVERAGE OF PROGRAMS IN DIGITAL AUDIO BROADCASTING

(71) Applicants: CHINA RADIO INTERNATIONAL, Beijing (CN); BROADEASE TECHNOLOGIES CO., LTD, Beijing (CN); BEIJING CRI-TECH RADIO AND TELEVISION TECHNOLOGIES CO., LTD., Beijing (CN)

(72) Inventors: Lian Wang, Beijing (CN); Yi Guan, Beijing (CN); Min Wu, Beijing (CN); Xinhong Xu, Beijing (CN); Xiaowei Cao, Beijing (CN); Hongqi Jiang, Beijing (CN); Xiaoge Huang, Beijing (CN); Xiaoning Feng, Beijing (CN)

(73) Assignees: CHINA RADIO INTERNATIONAL, Beijing (CN); BROADEASE TECHNOLOGIES CO., LTD., Beijing (CN); BEIJING CRI-TECH RADIO AND TELEVISION TECHNOLOGIES CO., LTD., Beijing (CN)

( * ) Notice: Subject to any disclaimer, the term of this patent is extended or adjusted under 35 U.S.C. 154(b) by 88 days.

(21) Appl. No.: 15/112,171

(22) PCT Filed: Jan. 16, 2015

(86) PCT No.: PCT/CN2015/070822

§ 371 (c)(1),
(2) Date: Jul. 16, 2016

(87) PCT Pub. No.: WO2015/106705

PCT Pub. Date: Jul. 23, 2015

(65) Prior Publication Data

US 2016/0344491 A1 Nov. 24, 2016

(30) Foreign Application Priority Data

Jan. 16, 2014 (CN) .......................... 2014 1 0019300

(51) Int. Cl.
*G06F 17/00* (2006.01)
*H04H 20/71* (2008.01)
(Continued)

(52) U.S. Cl.
CPC ............ *H04H 20/71* (2013.01); *H04H 20/26* (2013.01); *H04H 20/42* (2013.01); *H04H 20/72* (2013.01); *H04H 20/86* (2013.01)

(58) Field of Classification Search
CPC ...... H04H 20/106; H04H 20/22; H04H 20/28; H04H 20/67; H04H 60/54
See application file for complete search history.

(56) References Cited

U.S. PATENT DOCUMENTS 6,163,683 A * 12/2000 Dunn .................. H04H 20/106 455/150.1
6,600,908 B1 * 7/2003 Chan ...................... H04H 20/26 348/725
(Continued)

FOREIGN PATENT DOCUMENTS

CN 101222313 A 7/2008
CN 101600102 A 12/2009
(Continued)

*Primary Examiner* — Thomas Maung
(74) *Attorney, Agent, or Firm* — Hultquist, PLLC; Steven J. Hultquist

(57) ABSTRACT

The present invention relates to a method and system for implementing a large area and continuous coverage of programs in a digital audio broadcasting, wherein, part of carrier frequencies are set as common carrier frequencies, and other carrier frequencies are set as service carrier frequencies; all of the common carrier frequencies are combined together to achieve a seamless coverage for the
(Continued)

large area; a transmitting end transmits a common frequency point identifier and a program information list on the common carrier frequencies, and transmits digital broadcasting programs on the service carrier frequencies; a receiving end identifies the common carrier frequency based on the common frequency point identifier and receives the digital broadcasting program on the common carrier frequencies; for a specific program desired to be received, all the carrier frequencies on broadcasting of the program are searched based on the received program information list, and the carrier frequency with best signal quality is selected for receiving; during the reception process of the specific program, signal quality of other carrier frequency on broadcasting of the specific program is monitored, and when the signal quality of current receiving carrier frequency decreases, the program is continue to be received by switching to another carrier frequency with better signal quality. By using the method and system according to the present invention, it can be realized that programs can be continuously covered for a large area and received seamlessly.

18 Claims, 2 Drawing Sheets

(51) Int. Cl.

| | |
|---|---|
| ***H04H 20/72*** | (2008.01) |
| ***H04H 20/26*** | (2008.01) |
| ***H04H 20/42*** | (2008.01) |
| ***H04H 20/86*** | (2008.01) |

(56) References Cited

U.S. PATENT DOCUMENTS

2008/0160940 A1* 7/2008 Jendbro ................. H04H 20/28 455/185.1
2009/0257405 A1* 10/2009 Stamoulis ........... H04W 72/085 370/332
2016/0057684 A1* 2/2016 Larsson ................ H04W 36/26 370/331

FOREIGN PATENT DOCUMENTS

| | | | |
|---|---|---|---|
| CN | 101873540 | A | 10/2010 |
| CN | 103795486 | A | 5/2014 |
| EP | 1087582 | A2 | 3/2001 |

* cited by examiner

METHOD AND SYSTEM FOR IMPLEMENTING A LARGE AREA CONTINUOUS COVERAGE OF PROGRAMS IN DIGITAL AUDIO BROADCASTING

CROSS-REFERENCE TO RELATED APPLICATIONS

This application is a U.S. national phase under the provisions of 35 U.S.C. § 371 of International Patent Application No. PCT/CN/15/70822 filed Jan. 16, 2015, which in turn claims priority of Chinese Patent Application No. 201410019300.4 filed Jan. 16, 2014. The disclosures of such international patent application and Chinese priority patent application are hereby incorporated herein by reference in their respective entireties, for all purposes.

FIELD OF THE INVENTION

The present invention relates to digital audio broadcasting techniques, and in particular, to a method and system for implementing a large area continuous coverage of a program in a digital audio broadcasting.

BACKGROUND OF THE INVENTION

In a traditional analog audio broadcasting system (e.g. FM frequency modulation broadcasting or AM amplitude modulation broadcasting system), the broadcast program coverage is area-type coverage based on a broadcast transmission tower, that is, the broadcasting programs are carried on specific transmission frequency and transmitted by specific transmission tower to implement wireless coverage for certain area. Broadcasting programs in different coverage area are independent in the phase of network transmission and there is no particular relationship between each other, the result is that a user can only listen to the broadcasting programs continuously in a single coverage area, when the user moves out of the coverage area, the programs are certain to be interrupted, considering this point, even though the coverage areas of different broadcast stations are contiguous with each other and there is no coverage holes, the phenomenon of program interruption remain occurs when the user moves across the coverage areas of different stations, that is to say, programs coverage cannot be continuous.

In a digital audio system, one existing method for solving the above said problem is applying Single Frequency Network (SFN) or Multi Frequency Network (MFN) techniques to construct a uniform wireless audio broadcasting network that can cover large area, and the program can be uniformly broadcasted in the whole network coverage, and the seamless coverage of the programs can be implemented. However in early stage of development of the digital audio broadcasting, the digital audio broadcasting can only select to use idle frequencies that are not occupied by the analog audio broadcasting, which results in that too few frequencies are available to wide-area single frequency network or multi frequency network over the wide area, e.g. the nationwide, thereby the bandwidth requirement for developing business cannot be satisfied. Furthermore, it is required to transmit uniform program contents over the network when using the current single frequency network or multi frequency network technique to construct a large area coverage network, thus the seamless program handover can be implemented.

But this way does not comply with the regional program broadcasting requirement of the broadcast television industry.

Therefore, for the burgeoning digital audio broadcasting system, there is a need for a new technical method which is able to solve the problem of continuous and seamless program coverage across areas in large scale taking account into the basis of regional network coverage formed for many years in the audio broadcasting.

SUMMARY OF THE INVENTION

The present invention is to provide a new technical solution which is able to implement a continuous and seamless coverage of program across areas in large scale taking account into the basis of regional network coverage formed for many years in the audio broadcasting.

According to one aspect of the present invention, there is provided a method for implementing a large area continuous coverage of programs in a digital audio broadcasting, comprising that: setting part of the carrier frequencies of the digital audio broadcasting are set as common carrier frequencies and the other carrier frequencies are set as service carrier frequencies; all of the common carrier frequencies being combined together to achieve a seamless coverage for the large area; a transmitting end transmits a digital broadcasting signal, comprising: transmitting a common frequency point identifier and a program information list on the common carrier frequencies and transmitting a digital broadcasting program on the service carrier frequencies; the common frequency point identifier being used to distinguish the common carrier frequencies and the service carrier frequencies, the program information list including all sequence number of the digital broadcasting program and all of the frequency points on broadcasting of each digital broadcasting program; a receiving end receives the digital broadcasting signal, comprising: identifying the common carrier frequencies according to the common frequency point identifier and receiving the digital broadcasting signal on the common carrier frequency; for a specific program desired to receive, searching all the carrier frequencies on broadcasting according to the received program information list to select to receive the carrier frequency with best signal quality, and during the reception process of the specific program, monitoring the signal quality of other carrier frequencies on broadcasting of the specific program, and if the signal quality of the current receiving carrier frequency decreases, switching to another carrier frequency with better signal quality to continue receiving the specific program. According to the present invention, part of the carrier frequencies in the digital audio broadcasting are set as common carrier frequencies, and the common carrier frequencies are used to transmit the distribution information of program carrier frequencies, as all of the common carrier frequencies are combined together to form a seamless coverage for the large area, the receiving end can obtain the distribution list of the program carrier frequencies at anywhere within the large area, the carrier frequency with best signal quality can be selected to receive the programs according to the distribution information of the carrier frequencies, and the program would be effectively tracked and be switched over between different carrier frequencies on demand automatically for implementing a seamless switchover, thereby enlarging the seamless program coverage area from the coverage scale of single carrier frequency to the coverage scale of all of the carrier frequencies on broadcasting.

According to one embodiment of the present invention, only one carrier frequency is used to completely cover each minimum coverage area within the large area, and this carrier frequency is a common carrier frequency, wherein the minimum coverage area is the coverage area of a single transmission tower. This configuring method requires the fewest number of common carrier frequencies, thus more carrier frequencies can be freed up to be used as service frequencies for transmitting digital broadcasting programs, meanwhile, the service carrier frequencies do not need to cover the minimum coverage area and do not need high transmission power to be implemented, and it is beneficial to flexibly set the service carrier frequencies.

According to one embodiment of the present invention, the program information list is transmitted cyclically in a carousel mode on the common carrier frequencies. The network searching speed at the receiving end can be improved by the carousel cyclic transmission mode.

According to one embodiment of the present invention, the program information list is transmitted on a control channel or a service channel of the common carrier frequencies.

According to one embodiment of the present invention, if the number of the common carrier frequencies within the large area is more than one, the transmitting end transmits a common carrier frequency position information on each common carrier frequency so as to indicate other common carrier frequency to implement that the receiving end can switch over between different common carrier frequencies. When the receiving end leaves the coverage area of the current common carrier frequency and enters into the coverage area of another common carrier frequency, the common carrier frequency position information can be utilized to seek another common carrier frequency automatically, and the seamless coverage for the large area can be ensured further.

According to one embodiment of the present invention, the common carrier frequency position information comprises: the number of network frequency points, a central frequency, the number of neighboring networks, the number of neighboring network frequency points and the neighboring network central frequency.

According to one embodiment of the present invention, the common carrier frequency position information is transmitted cyclically in a carousel mode on the common carrier frequencies. The network searching speed at the receiving end can be improved by the carousel cyclic transmission mode.

According to one embodiment of the present invention, the common carrier frequency position information is transmitted on a control channel or a service channel of the common carrier frequencies.

According to one embodiment of the present invention, the program information list further comprises a fast access parameter set of each frequency point on broadcasting, the fast access parameter set includes all of or part of a system information of the frequency points on broadcasting, and the system information refers to physical layer configuration parameters of the digital broadcasting signal; if the signal quality of the current receiving carrier frequency decreases, the receiving end uses the fast access parameter set to quickly switch to another carrier frequency with better signal quality to continue receiving the specific program.

According to one embodiment of the present invention, the bits of the fast access parameter set and the corresponding system information are as follows:

| Bit | System Information |
|---|---|
| $b_0$~$b_1$ | Transmission mode |
| $b_2$~$b_7$ | Frequency spectrum mode index |
| $b_8$~$b_9$ | Sub-frame distribution mode |
| $b_{10}$~$b_{11}$ | Modulation mode of the service description information |
| $b_{12}$~$b_{13}$ | Modulation mode of the service information |
| $b_{14}$~$b_{15}$ | Hierarchical modulation indication of the service data |
| $b_{16}$ | Indication of using equal protection to encode the service data |
| $b_{17}$~$b_{18}$ | LDPC encoding rate of the service data |
| $b_{19}$~$b_{20}$ | LDPC encoding rate of the service data |
| $b_{21}$~$b_{31}$ | reserved |

$b_0$~$b_1$: transmission mode, 00 is reserved, 01 refers to transmission mode 1, 10 refers to transmission 2, and 11 refers to transmission mode 3;

$b_2$~$b_7$: frequency spectrum mode index;

$b_8$~$b_9$: sub-frame distribution mode; 00 is reserved, 01 refers to sub-frame distribution mode 1, 10 refers to sub-frame distribution mode 2 and 11 refers to sub-frame distribution mode 3;

$b_{10}$~$b_{11}$: modulation mode of the service description information; 00 refers to QPSK, 01 refers to 16QAM, 10 refers to 64QAM and 11 is reserved;

$b_{12}$~$b_{13}$: modulation mode of the service data; 00 refers to QPSK, 01 refers to 16QAM, 10 refers to 64QAM and 11 is reserved;

$b_{14}$~$b_{15}$: hierarchical modulation indication of the service data; 00 indicates the hierarchical modulation is not supported, 01 indicates the hierarchical modulation is supported and $\alpha$=1, 10 indicates the hierarchical modulation is supported and $\alpha$=2, and 11 indicates the hierarchical modulation is supported and $\alpha$=4;

$b_{16}$: indication of using equal protection to encoding the service data, 0 indicates the equal protection is not applied, and 1 indicates the equal protection is applied;

$b_{17}$~$b_{18}$: LDPC encoding rate of the service data; 00 refers to 1/4 encoding rate, 01 refers to 1/3 encoding rate, 10 refers to 1/2 encoding rate and 11 refers to 3/4 encoding rate;

$b_{19}$~$b_{20}$: LDPC encoding rate of the service data; 00 refers to 1/4 encoding rate, 01 refers to 1/3 encoding rate, 10 refers to 1/2 encoding rate, and 11 refers to 3/4 encoding rate;

wherein, in case of the non-hierarchical modulation, the encoding rate of the service data, when equal protection is used, is indicated by $b_{17}$~$b_{18}$, and $b_{19}$~$b_{20}$ are reserved; when unequal protection is used, the encoding rate of the service data is obtained from the service description information, and $b_{17}$~$b_{20}$ are reserved; in case of the hierarchical modulation, the encoding rate of the service data using high protection is indicated by $b_{17}$~$b_{18}$, and the encoding rate of the service data using low protection is indicated by $b_{19}$~$b_{20}$;

$b_{21}$~$b_{31}$: reserved for future extension use.

According to one embodiment of the present invention, the common carrier frequency identifier is included in the system information of the digital broadcasting signal, and the system information refers to the physical layer configuration parameters of the digital broadcasting signal; the system information comprises 48 bits, the bits and the corresponding system information are as follows:

| Bit | System Information |
|---|---|
| $b_0$ | Multi frequency point cooperative working mode indication |
| $b_1$~$b_9$ | Multi frequency point cooperative working frequency point for next sub-frame |
| $b_{10}$~$b_{12}$ | Current sub-band nominal frequency |
| $b_{13}$~$b_{18}$ | Frequency spectrum mode index |

-continued

| Bit | System Information |
|---|---|
| $b_{19}$~$b_{20}$ | Current physical layer signal frame position |
| $b_{21}$~$b_{22}$ | Current sub-frame positon |
| $b_{23}$~$b_{24}$ | Sub-frame distribution mode |
| $b_{25}$~$b_{26}$ | Modulation mode of the service description information |
| $b_{27}$~$b_{28}$ | Modulation mode of the service data |
| $b_{29}$~$b_{30}$ | Service data hierarchical modulation indication |
| $b_{31}$ | Indication of using equal protection to encode the service data |
| $b_{32}$~$b_{33}$ | LDPC encoding rate of the service data |
| $b_{34}$~$b_{35}$ | LDPC encoding rate of the service data |
| $b_{36}$ | Common frequency point indication |
| $b_{37}$~$b_{41}$ | Reserved |
| $b_{42}$~$b_{47}$ | CRC check digit |

$b_0$: multi frequency point cooperative working mode indication; 0 refers to multi frequency point cooperative working and 1 refers to non-multi frequency point cooperative working;

$b_1$~$b_9$: multi frequency point cooperative working frequency point for next sub-frame; the unsigned integers expressed by $b_1$~$b_9$ are I, the multi frequency point cooperative working frequency point for next sub-frame is (87+0.05I)MHz, and during the non-multi frequency point cooperative working, $b_1$~$b_9$ all are 1;

$b_{10}$~$b_{12}$: current sub-band nominal frequency;

$b_{13}$~$b_{18}$: frequency spectrum mode index;

$b_{19}$~$b_{20}$: the position of the current physical layer signal frame in one super frame; 00 refers to the first frame, 01 refers to the second frame, 10 refers to the third frame and 11 refers to the fourth frame;

$b_{21}$~$b_{22}$: the position of current sub-frame in one physical layer signal frame; 00 refers to the first sub-frame, 01 refers to the second sub-frame, 10 refers to the third sub-frame and 11 refers to the fourth sub-frame;

$b_{23}$~$b_{24}$: sub-frame distribution mode; 00 is reserved, 01 refers to sub-frame distribution mode 1, 10 refers to sub-frame distribution mode 2 and 11 refers to sub-frame distribution mode 3;

$b_{25}$~$b_{26}$: modulation mode of the service description information; 00 refers to QPSK, 01 refers to 16QAM, 10 refers to 64QAM and 11 is reserved;

$b_{27}$~$b_{28}$: modulation mode of the service data; 00 refers to QPSK, 01 refers to 16QAM, 10 refers to 64QAM and 11 is reserved;

$b_{29}$~$b_{30}$: hierarchical modulation indication of the service data; 00 indicates the hierarchical modulation is not supported, 01 indicates the hierarchical modulation is supported and $\alpha$=1, 10 indicates the hierarchical modulation is supported and $\alpha$=2 and 11 indicates the hierarchical modulation is supported and $\alpha$=4;

$b_{31}$: indication of using equal protection to encode the service data; 0 indicates the equal protection is not applied and 1 indicates the equal protection is applied;

$b_{32}$~$b_{33}$: LDPC encoding rates of the service data; 00 refers to 1/4 encoding rate, 01 refers to 1/3 encoding rate, 10 refers to 1/2 encoding rate and 11 refers to 3/4 encoding rate;

$b_{34}$~$b_{35}$: LDPC encoding rates of the service data; 00 refers to 1/4 encoding rate, 01 refers to 1/3 encoding rate, 10 refers to 1/2 encoding rate and 11 refers to 3/4 encoding rate;

wherein, in case of the non-hierarchical modulation, the encoding rate of the service data, when equal protection is used, is indicated by $b_{32}$~$b_{33}$, and $b_{34}$~$b_{35}$ are reserved; when unequal protection is used, the encoding rate of the service data is obtained from the service description information, and $b_{32}$~$b_{35}$ are reserved; in case of the hierarchical modulation, the encoding rate of the service data using high protection is indicated by $b_{32}$~$b_{33}$, and the encoding rate of the service data using low protection is indicated by $b_{34}$~$b_{35}$;

$b_{36}$: common frequency point indication; 0 refers to service frequency point, 1 refers to common frequency point and is a common frequency point identifier;

$b_{37}$~$b_{41}$: reserved for future extension use;

$b_{42}$~$b_{47}$: CRC check digits.

According to one embodiment of the present invention, the transmitting end implements time-delayed transmission based on the transmission time delays of respective frequency points on broadcasting when transmitting a digital broadcasting program on the service carrier frequency; the program information list further includes transmission time delays of each frequency point on of all the digital broadcasting programs; when receiving the digital broadcasting program, the receiving end firstly stores the digital broadcasting program in a buffer, compensates the time delay based on the transmission time delay of the current receiving carrier frequency to achieve a target delay time and then broadcasts the program, thus it is achieved that the digital broadcasting program can be seamlessly and continuously broadcasted over different carrier frequencies.

According to a second aspect of the present invention, there is provided a system for implementing a large area continuous coverage of programs in a digital audio broadcasting, comprising that: a transmitting end sets part of carrier frequencies of the digital audio broadcasting as common carrier frequencies and set other carrier frequencies as service carrier frequencies, all of the common carrier frequencies being combined together to achieve seamless coverage for the large area; transmits a digital broadcasting signal, comprising: transmitting a common frequency point identifier and a program information list on the common carrier frequencies and transmitting the digital broadcasting program on the service carrier frequencies; the common frequency point identifier is used to distinguish the common carrier frequencies and the service carrier frequencies, the program information list comprises all sequence number of the digital broadcasting programs and all frequency points on broadcasting of each digital broadcasting program; a receiving end receives the digital broadcasting signal, comprising: identifying the common carrier frequencies based on the common frequency point identifier and receiving the digital broadcasting signal on the common carrier frequencies; for a specific program desired to receive, searching all carrier frequencies on broadcasting according to the received program information list and selecting the carrier frequency with best signal quality to receive, during the reception process of the specific program, monitoring the signal quality of other carrier frequencies on broadcasting of the specific program, and switching to another carrier frequency with better signal quality to continue receiving the specific program if the signal quality of the current receiving carrier frequency decreases. According to the present invention, part of the carrier frequencies of the digital audio broadcasting are set as common carrier frequencies, and the common carrier frequency is used to transmit a distribution information of the program carrier frequencies, as all of the common carrier frequencies are combined together to achieve a seamless coverage for the large area, the receiving end can obtain a distribution list of the program carrier frequencies at anywhere within the large area, the carrier frequency with best signal quality can be selected to receive the program according to the distribution information of the program carrier frequencies, and the program would be effectively tracked and be switch over between different carrier frequencies on demand automatically to implement seamless switchover, thereby enlarging the seamless coverage area of the programs from the coverage area covered by single carrier frequency to the coverage area covered by all carrier frequencies on broadcasting.

According to one embodiment of the present invention, only one carrier frequency is used to completely cover each minimum coverage area within the large area, and this carrier frequency is a common carrier frequency, wherein the minimum coverage area is the coverage area of a single transmission tower. This configuring method requires the fewest number of common carrier frequencies, thus more carrier frequencies can be freed up to be used as service carrier frequencies to transmit digital broadcasting programs, meanwhile, the service carrier frequencies do not need to cover the minimum coverage area and do not need high transmission power to be implemented, and it is beneficial to flexibly set the service carrier frequencies.

According to one embodiment of the present invention, if the number of the common carrier frequencies within the large area is more than one, the transmitting end transmits common carrier frequency position information on each common carrier frequency to indicate other common carrier frequencies to implement that the receiving end can switch over between different common carrier frequencies. When the receiving end leaves the coverage area of the current common carrier frequency and enters into the coverage area of another common carrier frequency, the common carrier frequency position information can be utilized to seek another common carrier frequency automatically, and the seamless coverage for the large area can be ensured further.

According to one embodiment of the present invention, the common carrier frequency position information comprises: the number of network frequency points, a central frequency, the number of neighboring networks, the number of neighboring network frequency points and the neighboring network central frequency.

According to one embodiment of the present invention, the program information list further comprises a fast access parameter set of each frequency point on broadcasting, the fast access parameter set includes all of or part of a system information of the frequency point on broadcasting, and the system information refers to physical layer configuration parameters of the digital broadcasting signal; if the signal quality of the current receiving carrier frequency decreases, the receiving end uses the fast access parameter set to quickly switch over to another carrier frequency with better signal quality to continue receiving the specific program.

According to one embodiment of the present invention, the transmitting end implement time-delayed transmission based on the transmission time delays of respective frequency points on broadcasting when transmitting a digital broadcasting program on the service carrier frequencies; the program information list further includes transmission time delays of each frequency point on broadcasting of all digital broadcasting programs; the receiving end, when receiving the digital broadcasting program, firstly stores the digital broadcasting program in a buffer, compensates the time delay based on the transmission time delays of the current receiving carrier frequency to achieve a target delay time and then plays the program, thus it is realized that the digital broadcasting program can be seamlessly and continuously broadcasted over different carrier frequencies.

According to a third aspect of the present invention, there is provided a transmitting system for implementing a large area continuous coverage of programs in a digital audio broadcasting, the transmitting system sets part of carrier frequencies of the digital audio broadcasting as common carrier frequencies, and sets other carrier frequencies as service carrier frequencies, and all of the common carrier frequencies are combined together to achieve seamless coverage for the large area; a common frequency point identifier and a program information list are transmitted on the common carrier frequencies and the digital broadcasting program is transmitted on the service carrier frequencies; the common frequency point identifier is used to distinguish the common carrier frequencies and the service carrier frequencies, and the program information list includes all sequence numbers of the digital broadcasting programs and all frequency points on broadcasting of each digital broadcasting program.

According to a fourth aspect of the present invention, there is provided a receiving system for implementing a large area and continuous coverage of programs in a digital audio broadcasting, the receiving system identifies the common carrier frequencies based on a common frequency point identifier, receives the digital broadcasting signals on the common carrier frequencies and obtain a program information list; for a specific program desired to receive, all the carrier frequencies on broadcasting of the are searched based on the program information list, and the carrier frequency with best signal quality is selected for receiving; during the reception process of the specific program, signal quality of other carrier frequency on broadcasting of the specific program is monitored, and if the signal quality of current receiving carrier frequency decreases, the specific program continues to be received by switching to another carrier frequency with better signal quality; wherein the common frequency point identifier is used to identify the common carrier frequencies, and the program information list includes all sequence numbers of the digital broadcasting program and all frequency points on broadcasting of each digital broadcasting program.

The inventors of the present invention have found that, there is no technical solutions that can realize a large scale cross-regional and continuous seamless coverage of programs in existing digital audio broadcasting art. So, the task to be implemented by or the technical problem to be solved by the present invention has not been conceived or anticipated by a person skilled in the art and thus the present invention is a new solution. According to the method and system of the present invention, part of carrier frequencies of the digital audio broadcasting are set as common carrier frequencies which are utilized to transmit distribution information of program carrier frequencies, as all the common carrier frequencies are combined together to achieve a seamless coverage for the large area, the receiving end would obtain the distribution information of the program carrier frequencies at anywhere of the large area, select the carrier frequency with good signal quality to receive the program based on the distribution information of the carrier frequencies, effectively tracks the programs and automatically transfers among different carrier frequencies as needed to realize a seamless switchover, thereby the seamless coverage scale of the program can be enlarged from the coverage scale of single carrier frequency to the coverage scale of all the current broadcasting carrier frequencies.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
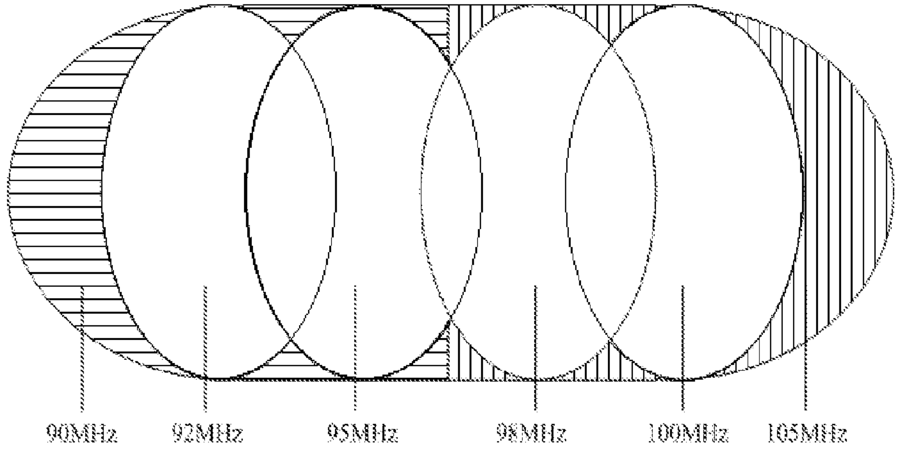
FIG. 1 is a schematic diagram of setting the common carrier frequencies and service carrier frequencies according to one embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In one embodiment of the present invention, referring to FIG. 1, in all available carrier frequencies of the digital audio broadcasting, one or several carrier frequencies are selected as common carrier frequencies, the remaining carrier frequencies unselected are set as service carrier frequencies. The basis for selecting the common carrier frequencies is that all of the common carrier frequencies can be combined together to achieve a seamless coverage for the large area. Furthermore, in order to make the number of the common carrier frequencies to be few enough, and more carrier frequencies can be freed up to be set as service carrier frequencies for transmitting the digital broadcasting programs, any minimum coverage area in the large area uses only one common carrier frequency to achieve a complete coverage, wherein the minimum coverage area refers to the coverage area of single transmission tower. As can be seen in FIG. 1, two common carrier frequencies 90 MHz and 150 MHz are combined together to completely cover the large area, each of the service carrier frequencies 92 MHz, 95 MHz, 98 MHz and 100 MHz covers a small scale respectively, but the overall coverage scale is still smaller than the coverage scale of the common carrier frequencies, the uncovered part can be complemented by the form of same frequency point-adding, there is no need to be repeated here.

A transmitting end transmits a program information list on the common carrier frequencies, and transmits a digital broadcasting program on the service carrier frequencies. Meanwhile, in order to be easy to identify the common carrier frequencies and service carrier frequencies by a receiving end, a common frequency point identifier is transmitted in the common carrier frequencies, and the common frequency point identifier is used to distinguish the common carrier frequencies and the service carrier frequencies. The common frequency point identifier includes, but is not limited to: (1) a specifically defined signal frequency spectrum template; (2) specifically defined physical layer configuration information; and (3) a specifically defined program identifier.

In one embodiment of the present invention, the program information list includes all sequence number of the digital broadcasting programs on broadcasting in the network and all frequency points on broadcasting of each digital broadcasting program. In another embodiment of the present invention, the program information list includes the following contents: (1) all sequence numbers of digital broadcasting programs on broadcasting in the network; (2) all o frequency points on broadcasting of each program; (3) a fast access parameter set of each frequency point on broadcasting, and the fast access parameter set including all of or part of a system information of the current broadcasting frequency point, and the system information referring to the physical layer configuration parameters of the digital broadcasting signal; (4) transmission time delays of each program on respective frequency points on broadcasting; the transmitting end implements time-delayed transmission based on the transmission time delay of corresponding broadcasting frequency point when transmitting the digital broadcasting program on the service carrier frequencies.

Meanwhile, if the number of the common carrier frequencies is more than one, the transmission end transmits common carrier frequency position information on each common carrier frequency for indicating other common carrier frequencies so as to facilitate the receiving end to switch over between different common carrier frequencies.

The above mentioned program information list and common carrier frequency position information can be transmitted on a control channel or a service channel of the common carrier frequencies. Meanwhile, in order to improve the network searching speed of a receiving end, the program information list and common carrier frequency position information are transmitted cyclically using a carousel mode.

In this way, the receiving end can successfully and effectively distinguish all the common carrier frequencies and the service carrier frequencies by using the common frequency point identifier of the common carrier frequencies. Then, the receiving end can obtain distribution information of the carrier frequencies of all programs by receiving the program information list on the common carrier frequencies. After a user selects one program, the receiving end conducts frequency searching according to the on-broadcasting carrier frequency set corresponding to the program sequence number in the program information list, and selects the carrier frequency with best signal quality to receive the program. During the process of receiving program, the receiving end monitors the signal quality of other carrier frequencies in the program carrier frequency set all the time, if the signal quality of the current receiving carrier frequency drops to a level at which the receiving end cannot receive the program or drops to a certain level, e.g. 70%, the receiving end utilizes the fast access parameter set to quickly switch to another carrier frequency with better signal quality and can be normally received to continue receiving the program. Furthermore, as the transmitting end transmits the digital broadcasting program on the service carrier frequencies based on the transmission time delays of respective frequency points on broadcasting and implements time-delayed transmission, the receiving end firstly stores the digital broadcasting program in a buffer when receiving the digital broadcasting program, then compensates the time delay according to the transmission time delay of the current receiving carrier frequency, and after that, broadcasts the program. It is ensured that the program can be broadcasted according to a target delay time when the same program is received on different carrier frequencies, thereby achieving that the same program can be seamlessly and continuously received across different carrier frequencies.

In the following, embodiments of the present invention would be described in detail in combination with a digital audio broadcasting system (CDR) of the Chinese FM band. In one embodiment of the present invention, the process for generating the digital broadcasting signal comprises: encoding and mapping, by the transmitting end, the service data, the service description information and the system information to generate a service data sub-carrier, a service description information sub-carrier and a system information sub-carrier; generating a pilot, and mapping the pilot along with the above mentioned sub-carriers to corresponding frequency spectrum mode to form an OFDM symbol in frequency domain; implementing IFFT transformation to the OFDM frequency domain symbol to generate an OFDM symbol in time domain; multiplexing $S_N$ OFDM time domain symbols together and inserting a beacon to connect to be a logic layer frame structure; conducting sub-frame distribution to the logic layer frame structure to form a physical layer frame structure; transforming the physical layer frame structure from the baseband to the radio frequency and transmitting it; wherein the physical layer frame structure is that one super frame comprises multiple physical layer signal frames, one physical layer signal frame comprises multiple sub-frames, and one sub-frame comprises a beacon and $S_N$ OFDM symbols.

Wherein, the system information refers to the physical layer configuration parameter of the digital broadcasting signal, the receiving end utilizes the system information to demodulate and decode the digital broadcasting signal. The system information includes 48 bits, and the bits and corresponding system information are shown in Table 1:

TABLE 1

| Bit | System Information |
|---|---|
| $b_0$ | Multi frequency point cooperative working indication |
| $b_1$~$b_9$ | Multi frequency point cooperative working frequency point for next sub-frame |
| $b_{10}$~$b_{12}$ | Current sub-band nominal frequency |
| $b_{13}$~$b_{18}$ | Frequency spectrum mode index |
| $b_{19}$~$b_{20}$ | Current physical layer signal frame position |
| $b_{21}$~$b_{22}$ | Current sub-frame positon |
| $b_{23}$~$b_{24}$ | Sub-frame distribution mode |
| $b_{25}$~$b_{26}$ | Modulation mode of the service description information |
| $b_{27}$~$b_{28}$ | Modulation mode of the service data |
| $b_{29}$~$b_{30}$ | Service data hierarchical modulation indication |
| $b_{31}$ | Indication of using equal protection to encode the service data |
| $b_{32}$~$b_{33}$ | LDPC encoding rate of the service data |
| $b_{34}$~$b_{35}$ | LDPC encoding rate of the service data |
| $b_{36}$ | Common frequency point indication |
| $b_{37}$~$b_{41}$ | Reserved |
| $b_{42}$~$b_{47}$ | CRC check digits |

$b_0$: multi frequency point cooperative working indication; 0 refers to multi frequency point cooperative working; 1 refers to non-multi frequency point cooperative working;

$b_1$~$b_0$: multi frequency point cooperative working frequency point for next sub-frame; let the unsigned integers (wherein $b_0$ is the highest significant bit) expressed by $b_1$-$b_9$ be I, the multi frequency point cooperative working frequency point for next sub-frame is (87+0.05I)MHz, and during the non-multi frequency point cooperative working, $b_1$~$b_9$ all are 1;

$b_{10}$~$b_{12}$: current sub-band nominal frequency, the definitions are shown in the Table 2, and $b_{10}$~$b_{12}$ corresponds to $s_0$~$s_2$ in the Table 2 in turn;

$b_{13}$~$b_{18}$: frequency spectrum mode index; the definitions are shown in the Table 3 and correspond to $s_0$~$s_5$ in the Table 3 in turn;

$b_{19}$~$b_{20}$: current physical layer signal frame position in one super frame, 00 refers to the first frame, 01 refers to the second frame, 10 refers to the third frame and 11 refers to the fourth frame;

$b_{21}$~$b_{22}$: current sub-frame position in one physical layer signal frame; 00 refers to the first sub-frame, 01 refers to the second sub-frame, 10 refers to the third sub-frame and 11 refers to the fourth sub-frame;

$b_{23}$~$b_{24}$: sub-frame distribution mode; 00 is reserved, 01 refers to sub-frame distribution mode 1, 10 refers to sub-frame distribution mode 2 and 11 refers to sub-frame distribution mode 3;

$b_{25}$~$b_{26}$: modulation mode of the service description information; 00 refers to QPSK, 01 refers to 16QAM, 10 refers to 64QAM and 11 is reserved;

$b_{27}$~$b_{28}$: modulation mode of the service data, 00 refers to QPSK, 01 refers to 16QAM, 10 refers to 64QAM and 11 is reserved;

$b_{29}$~$b_{30}$: hierarchical modulation indication of the service data; 00 indicates the hierarchical modulation is not supported, 01 indicates the hierarchical modulation is supported and α=1, 10 indicates the hierarchical modulation is supported and α=2, and, 11 indicates the hierarchical modulation is supported and α=4;

$b_{31}$: indication of using equal protection to encode the service data; 0 indicates the equal protection is not applied, and 1 indicates the equal protection is applied.

$b_{32}$~$b_{33}$: LDPC encoding rate of the service data; 00 refers to 1/4 encoding rate, 01 refers to 1/3 encoding rate, 10 refers to 1/2 encoding rate and 11 refers to 3/4 encoding rate;

$b_{34}$~$b_{35}$: LDPC encoding rate of the service data; 00 refers to 1/4 encoding rate, 01 refers to 1/3 encoding rate, 10 refers to 1/2 encoding rate and 11 refers to 3/4 encoding rate;

Wherein, in case of the non-hierarchical modulation, the encoding rate of the service data, when equal protection is used, is indicated by $b_{32}$~$b_{33}$, and $b_{34}$~$b_{35}$ are reserved; when unequal protection is used, the encoding rate of the service data is obtained from the service description information, and $b_{32}$~$b_{35}$ are reserved; in case of the hierarchical modulation, the encoding rate of the service data using high protection is indicated by $b_{32}$~$b_{33}$, and the encoding rate of the service data using low protection is indicated by $b_{34}$~$b_{35}$;

$b_{36}$: common frequency point indication; 0 refers to a service frequency point, 1 refers to a common frequency point, and it is a common frequency point identifier;

$b_{37}$~$b_{41}$: reserved for future extension use;

$b_{42}$~$b_{47}$: CRC check digits.

Figure 2:
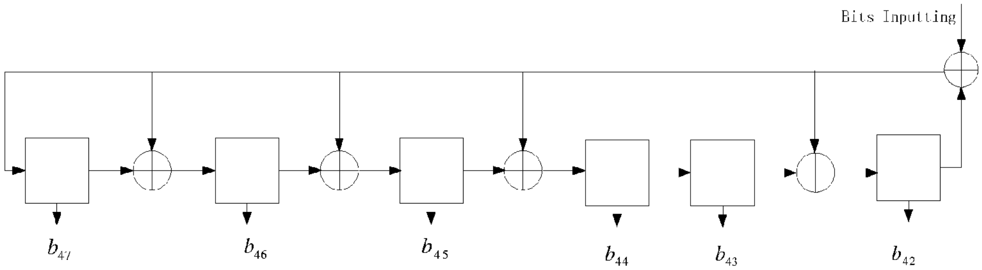
FIG. 2 is a block diagram of a CRC shifting register according to one embodiment of the present invention.

The CRC check digits of the 42th to 47th bits in Table 1 are obtained by conducting CRC calculation for system information 0 to 41 in sequence. The polynomial for generating CRC is: $G_6(x)=x^6+x^5+x^3+x^2+x+1$, the block diagram of the corresponding shifting register is shown in Fig. 2, and the initial value of the shifting register is 111111.

Wherein, the corresponding relations between the sub-band nominal frequencies and the description bits are shown in Table 2:

TABLE 2

| Bit Value $s_0s_1s_2$ | Sub-band Nominal Frequency kHz |
|---|---|
| 000 | 0 |
| 001 | 50 |
| 010 | 100 |
| 011 | 150 |
| 100 | 200 |
| 101~111 | reserved |

Wherein, the spectrum mode includes an A-type frequency spectrum mode and a B-type frequency spectrum mode; the A-type frequency spectrum mode includes eight sub-bands, and the sub-band nominal frequency points are ±(i*100+50)kHz, i=0, 1, 2, 3; the B-type frequency spectrum mode includes seven sub-bands, and the sub-band nominal frequency points are ±i*100 kHz, i=0, 1, 2, 3; the band width of one sub-band is 100 KHz. the frequency spectrum mode includes thirty nine modes, and in one embodiment of the present invention, the corresponding relations between the bit definitions and the frequency spectrum mode indices are shown in Table 3:

TABLE 3

| Bit Definition $s_0$~$s_5$ | Frequency Spectrum Mode Index |
|---|---|
| 000001 | 1 |
| 000010 | 2 |
| 001001 | 9 |
| 001010 | 10 |
| 010110 | 22 |
| 010111 | 23 |
| other | reserved |

Referring to FIG. 1, assuming that the CDR network is utilized to achieve continuous coverage in one area for one broadcasting program, the number of the selectable common frequency points is two: 90 MHz and 105 MHz, the number of the selectable service frequency points is four: 92 MHz, 95 MHz, 98 MHz and 100 MHz, and the channel parameters of respective frequency points are different between each other.

The receiving end searches the two common carrier frequencies of 90 MHz and 105 MHz by analyzing the system information $b_{36}$ in the digital broadcasting signal to determine whether it is a common carrier frequency, if $b_{36}$ is equal to 1, it indicates that this carrier frequency is a common carrier frequency. The receiving end receives all the data transmitted on the common carrier frequencies integrally, then, assuming that the system information obtained by resolving on the 90 MHz and 105 MHz respectively are:

11111111_11000000_00100000_10000001_01001000_00010101 and

11111111_11011001_00100000_10000001_01001000_00100111, which indicates that 90 MHz and 105 MHz are common carrier frequencies, wherein, the frequency spectrum template of the 90 MHz common frequency point is mode index 1 with QPSK modulation and the LDPC encoding rate is 1/3; and the frequency spectrum template of the 105 MHz common frequency point is mode index 9 with QPSK modulation and LDPC encoding rate is 1/3.

In one embodiment of the present invention, the digital audio broadcasting system multiplexes the channels by: dividing the information required to be transmitted on the digital audio broadcasting channel into service description information and service data; packaging the service description information using a first multiplexing frame mode to generate a control multiplexing frame; packaging the service data using a second multiplexing frame mode to generate a service multiplexing frame; providing a service description information channel and a service data channel in each logic frame to carry one control multiplexing frame and one or more service multiplexing frames respectively. In particular, the step for packaging the service description information using the first multiplexing frame mode to generate the control multiplexing frame comprises: inserting one or more control information lists into the multiplexing frame payload of the control multiplexing frame; and inserting the fields for indicating the number of the control information lists included in the multiplexing frame payload and the length of each control information list into the multiplexing frame head of the control multiplexing frame. The control information list includes a service multiplexing configuration list and a network information list, and the service multiplexing configuration list and network information list are used to respectively carry configuration information of each service multiplexing frame in the current frequency point and the attribute information of both of the digital audio broadcasting network and the neighboring network. Further, if the length of the control information list exceeds the available capacity of the service description information channel in one logic frame, the control information list is segmented, and the control information list after being segmented is transmitted in different logic frames. This multiplexing method is adapted to the physical layer transmission characteristics of the digital audio broadcasting system, not only ensuring the flexibility and high efficiency of the service multiplex, but also achieving clean separation of the control channel (service description information channel) and the service channel (service data channel).

The digital audio broadcasting transmission system operated and managed by an operator is referred to as one network, other networks, known by this network and the coverage of which are overlapped with this network, are referred to as neighboring networks. The network information list describes and includes: list identifier, segment length, segment sequence number, the number of the segments and network information list updating sequence number, country code, network code, the number of the network frequency points and the central frequency of each frequency point, length of the network name and characters of each name, the number of neighboring networks, the neighboring network code, the number of the neighboring network frequency points and the central frequencies of the neighboring networks. Wherein, N1 refers to the number of the current network frequency points, N2 refers to the length of the current network name, N3 refers to the number of the neighboring network and N4 refers to the number of the frequency points corresponding to a specific neighboring network.

Segmenting the network information list comprises: making each segment include list identifier, segment length, segment sequence number, the number of segments and the network information list updating sequence number; keeping the country code, network code, the number of network frequency points and the central frequency of each frequency point, the network name length and the characters of each name, the number of the neighboring network in one segment; keeping the neighboring network number, the number of the neighboring network frequency points and the central frequency of the neighboring network of the same neighboring network in one segment, and keeping the neighboring network number, the number of neighboring network frequency points and the neighboring network central frequency of different neighboring networks in different segments.

In the present embodiment, the reference is made to definitions of the network information list shown in Table 4:

TABLE 4

| Grammer | The number of bits | Identifier |
|---|---|---|
| Netwrok information list ( ) | | |
| { | | |
| List identifier | 8 | bslbf |
| Segment length | 16 | uimsbf |
| Segment sequence number | 4 | uimsbf |
| The number ofsegmens | 4 | uimsbf |
| Network information list updating sequency number | 4 | uimsbf |
| reserved | 4 | bslbf |
| if(segment sequence number==0) | | |
| { | | |
| Country code | 24 | bslbf |
| Network code | 36 | bslbf |
| The number of nerwork frequency points(N1) | 12 | uimsbf |
| for (i1 = 0; i1< N1; i1++) | | |
| { | 32 | bslbf |
| Central frequency | | |
| } | 8 | uimsbf |
| Network name length(N2) | | |
| for (i2 = 0; i2 < N2; i2++ ) | | |
| { | | |
| characters | 8 | bslbf |
| } | | |
| } | | |
| The number of neighboring networks(N3) | 6 | uimsbf |
| reserved | 2 | bslbf |
| for (i3 = 0; i3 < N3; i3++ ) | | |
| { | | |
| Neighboring network number | 36 | bslbf |
| Number of neighboring network frequency points(N4) | 4 | uimsbf |
| for (i4 = 0; i4 < N4; i4++) | | |
| { | | |
| Neighboring network central frequency | 32 | bslbf |
| } | | |
| reserved | 16 | bslbf |
| } | | |
| CRC_32 | 32 | bslbf |
| } | | |

list identifier number: 8 bit field, 0X02 refers to the network information list. segment length: 16 bit field, it comprises the length of all fields in current network information list except the CRC_32, the unit is byte.

segment sequence number: 4 bit field, it refers to segment sequence number of the network information list and starts counting from 0.

the number of the segments: 4 bit field, it refers to the number of the divided segments in the network information list.

network information list updating sequence number: 4 bit field, it refers to network information list updating sequence number. If the description information in the list is changed, the network information list updating sequence number is required to be changed, the value is circularly in the range of 0~15 and increments by 1 for one time of updating.

country code: 24 bit field, it indicates the country using 3 character code according to GB/T 2659-2000, each character is encoded to 8 bit according to GB/T 15273.1-1994, the encoded 24 bit code identifies one country uniquely. For example, China is indicated by 3 character code "CHN" and is encoded to "0100 0011 0100 1000 0100 1110".

network code: 36 bit field, and it uniquely identifies one network, wherein the 0~31 bit are reserved for future use.

the number of network frequency points: 12 bit field, providing the number of the frequency points in the network.

central frequency: 32 bit field, providing specific central frequency parameter by unit of 10 Hz; 0x00000000 and 0x00000001 are forbidden to use.

network name length: 8 bit field, and it is used to describe the length of the network name, and the unit is byte.

character: 8 bit field, one string, providing the name of the network which NIT is located. The character set and encoding method used by the text information encoding are shown in appendix A of GB/T 28161-2011.

the number of neighboring networks: 6 bit field, providing the number of neighboring networks in current segment.

neighboring network number: 36 bit field, it can uniquely identify one neighboring network, wherein 0~31 are reserved for future use.

the number of neighboring network frequency points: 4 bit field, providing the number of frequency points in neighboring network.

neighboring network central frequency: 32 bit field, providing specific central frequency parameter, the unit is 10 Hz, and 0x00000000 and 0x00000001 are forbidden to use. CRC_32: 32 bit field, CRC check value of the network information list parameters (CRC value is not included).

In the present embodiment, because there are two common carrier frequencies (larger than 1), so it is required to transmit common carrier frequency position information on the common carrier frequencies to indicate the other common carrier frequency, so that the receiving end can switch over between the two common carrier frequencies. In one embodiment, specific data of the control multiplexing frame—network information list is used to transmit the common carrier frequency position information, further in order to improve the network searching speed at the receiving end, the network information list is circularly transmitted on the common carrier frequency in a carousel mode. The time interval of carousel takes into comprehensive consideration of the dada quantity in the network information list. In this embodiment, the time interval is defined as 5 seconds. In one embodiment of the present invention, the common carrier frequency position information includes the number of the network frequency points, central frequency, the number of neighboring networks, the number of the neighboring network frequency points and the neighboring network central frequency, wherein, the common carrier frequency position information in the network information list of the 90 MHz common carrier frequency is shown in Table 5, and the common carrier frequency position information in the network information list of the 105 MHz common carrier frequency is shown in Table 6.

TABLE 5

| Related information in the network information list | Value | Description |
|---|---|---|
| The number of network frequency points | 1 | 90 MHz one frequency point |
| Central frequency | 0x895440 | Expressing 90 MHz by unit of 10 Hz |
| The number of neighboring networks | 1 | Network located by 105 MHz |
| The number of neighboring network frequency points | 1 | 105 MHz one frequency point |
| Central frequency of neighboring network | 0xA037A0 | Expressing 105 MHz by unit of 10 Hz |

TABLE 6

| Related information in the network information list | Value | Description |
|---|---|---|
| The number of network frequency points | 1 | 105 MHz one frequency point |
| Central frequency | 0xA037A0 | Expressing 105 MHz by units of 10 Hz |
| The number of neighboring networks | 1 | Network located by 90 MHz |
| The number of neighboring network frequency points | 1 | 90 MHz one frequency point |
| Central frequency of neighboring network | 0x895440 | Expressing 90 MHz by units of 10 Hz |

Figure 3:
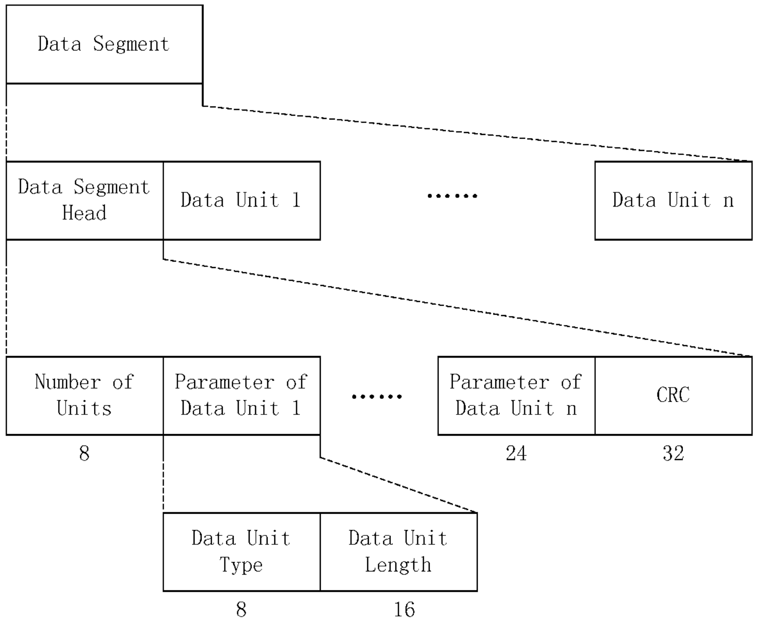
FIG. 3 is a schematic diagram of data segment definition of a program information list according to one embodiment of the present invention.

In one embodiment of the present invention, the program information list transmitted on the common carrier frequency is located at the data segment of the service multiplexing frame payload, the data segment definitions are shown in FIG. 3, Table 7 and Table 8.

TABLE 7

| Grammer | bits | identifier |
|---|---|---|
| Data segment head | | |
| { | | |
| The number of data units(N) | 8 | uimsbf |
| for ( i = 0; i < N; 1++) | | |
| { | | |
| Data unit type | 8 | bslbf |
| Data unit length | 16 | uimsbf |
| } | | |
| CRC_32 | 32 | bslbf |
| } | | |

the number of data units: 8 bit field, referring to total numbers of the data units.

data unit type: 8 bit field, referring to the type of the data unit, the definitions of which are seen in Table 8.

data unit length: 16 bit field, referring to the length of the data unit; the unit is byte. CRC_32: 32 bit field, the CRC check digits for the data segment head parameter (CRC value is not included).

TABLE 8

| Value | Data unit type |
|---|---|
| 0 | ESG data |
| 1 | ESG program prompt information |
| 2 | Prompt information for the program information list on the common frequency point |
| 3~63 | Reserved |
| 64 | Urgent broadcasting data |
| 65~159 | Reserved |
| 160 | Data broadcasting data |
| 161~169 | Reserved for data broadcasting |
| 170~254 | Reserved |
| 255 | System test data unit type |

In one embodiment of the present invention, the specially defined program information list is transmitted on the common carrier frequency, including: (1) all sequence numbers of the digital broadcasting programs broadcasting in the network; (2) all the frequency points on broadcasting of each program; (3) a fast access parameter set of each frequency point on broadcasting, wherein the fast access parameter set includes all of or part of system information of the frequency point on broadcasting, and the system information refers to physical layer configuration parameter of the digital broadcasting signal; (4) transmission time delays of each program broadcasting on respective broadcasting frequency points; wherein the transmitting end implements time-delayed transmission based on the transmission time delays of respective broadcasting frequency points when transmitting the digital broadcasting programs on the service carrier frequencies. The specific definitions of the program information list are shown in Table 9:

TABLE 9

| Grammer | Bits | Identifier |
|---|---|---|
| Program information list ( ) | | |
| { | | |
| Program information list updating sequence numbner | 4 | uimsbf |
| Reserved | 4 | bslbf |
| Program numbers (N1) | 16 | uimsbf |
| for (i1 = 0; i1< N1; i1++) | | |
| { | | |
| Programe sequence number | 32 | bslbf |
| Program name length (N2) | 8 | uimsbf |
| for (i2 = 0; i2 < N2; i2++) | | |
| { | | |
| character | 8 | bslbf |
| } | | |
| The number of the broadcasting frequency points for the program(N3) | 16 | uimsbf |
| for (i3 = 0; i3 < N3; i3++) | | |
| { | | |
| Central frequency | 32 | bslbf |
| Relative time delay of the program | 32 | bslbf |
| | 32 | bslbf |
| Channel parameter information | 32 | bslbf |
| Reserved | | |
| } | | |
| reserved | 32 | bslbf |
| } | | |

program information list updating sequence number: 4 bit field, referring to the updating sequence number of the program information list. When the description information in this table is changed, the updating sequence number of the program information list is required to be changed, and the value is circularly in the range of 0~15 and increments by 1 for one time of updating.

program numbers: 16 bit field, the number of all the broadcasting programs in the region.

program sequence number: 32 bit field, for uniquely identifying a program. program name length: 8 bit field, used for describing the length of the program name, the unit is byte.

character: 8 bit field, one string, providing a specific program name. The character set and encoding method used by the text information encoding can refer to the appendix A of the digital TV broadcasting service information criterion GB/T 28161-2011.

the number of broadcasting frequency points for the program: 16 bit field, referring to how many frequency points are used to broadcast the program in the region.

central frequency: 32 bit field, providing specific central frequency parameter, the unit is 10 Hz, and 0x00000000 and 0x00000001 are forbidden to use.

relative time delay of the program: 32 bit field, providing specific central frequency paramether, the unit is 100 ns; the frequency point at the time of i3=0 is a reference frequency point for time delay (i.e. the relative time delay is equal to 0), the time delays of other frequency points are based on this frequency point.

channel parameter information: i.e. the fast access parameter set, 32 bit field, the definitions of bit $b_0$ $b_1$ . . . $b_{31}$ are shown in Table 10.

TABLE 10

| Bit | Information description |
|---|---|
| $b_0$~$b_1$ | Transmission mode |
| $b_2$~$b_7$ | Frequency spectrum mode index, referring to Table 3 |
| $b_8$~$b_9$ | Sub-frame distribution method |
| $b_{10}$~$b_{11}$ | Modulation mode of sevice description information |
| $b_{12}$~$b_{13}$ | Modulation mode of service information |
| $b_{14}$~$b_{15}$ | Hierarchical modulation indication of the service data |
| $b_{16}$ | Indication of using equal protection to encode the service data |
| $b_{17}$~$b_{18}$ | LDPC encoding rate of the service data |
| $b_{19}$~$b_{20}$ | LDPC encoding rate of the service data |
| $b_{21}$~$b_{31}$ | Reserved |

$b_0$~$b_1$: transmission mode; 00 is reserved, 01 refers to transmission mode 1, 10 refers to transmission mode 2 and 11 refers to transmission mode 3; in one embodiment of the present invention, the digital audio broadcasting system provides three types of transmission modes which can be configured as needed: each of the logic sub-frame includes $S_N$ OFDM symbols and one OFDM beacon symbol, in mode 1, the $S_N$ is 56; in mode 2, the $S_N$ is 111; and in mode 3, the $S_N$ is 61;

$b_2$~$b_7$: frequency spectrum mode index, the definitions are seen in Table 3 and correspond to $s_0$~$s_5$ in Table 3 in sequence.

$b_8$~$b_9$: sub-frame distribution mode; 00 is reserved, 01 refers to sub-frame distribution mode 1, 10 refers to sub-frame distribution mode 2 and 11 refers to sub-frame distribution mode 3;

$b_{10}$~$b_{11}$: modulation mode of the service description information; 00 refers to QPSK, 01 refers to 16QAM, 10 refers to 64QAM and 11 is reserved;

$b_{12}$~$b_{13}$: modulation mode of the service data; 00 refers to QPSK, 01 refers to 16QAM, 10 refers to 64QAM and 11 is reserved;

$b_{14}$~$b_{15}$: hierarchical modulation indication of the service data; 00 indicates the hierarchical modulation is not supported, 01 indicates the hierarchical modulation is supported and $\alpha$=1, 10 indicates the hierarchical modulation is supported and $\alpha$=2, and 11 indicates the hierarchical modulation is supported and $\alpha$=4;

$b_{16}$: indication of using equal protection to encoding the service data, 0 indicates the equal protection is not applied, and 1 indicates the equal protection is applied;

$b_{17}$~$b_{18}$: LDPC encoding rate of the service data; 00 refers to 1/4 encoding rate, 01 refers to 1/3 encoding rate, 10 refers to 1/2 encoding rate and 11 refers to 3/4 encoding rate;

$b_{19}$~$b_{20}$: LDPC encoding rate of the service data; 00 refers to 1/4 encoding rate, 01 refers to 1/3 encoding rate, 10 refers to 1/2 encoding rate, and 11 refers to 3/4 encoding rate;

wherein, in case of the non-hierarchical modulation, the encoding rate of the service data, when equal protection is used, is indicated by $b_{17}$~$b_{18}$, and $b_{19}$~$b_{20}$ are reserved; when unequal protection is used, the encoding rate of the service data is obtained from the service description information, and $b_{17}$~$b_{20}$ are reserved; in case of the hierarchical modulation, the encoding rate of the service data using high protection is indicated by $b_{17}$~$b_{18}$, and the encoding rate of the service data using low protection is indicated by $b_{19}$~$b_{20}$;

$b_{21}$~$b_{31}$: reserved for future extension use.

Table 11 is the embodiment of the related data of the program information list transmitted on the common carrier frequency, it can be known from Table 11 that: the current broadcasting program in the region is one, and is broadcasted on four frequency points respectively: 105 MHz, 95 MHz, 97 MHz and 100 MHz, the 105 MHz frequency point is set as a time delay reference frequency, and the program time delays on 95 M, 97 M and 100 M respectively are: 0.1 second, 0.5 second and 1 second. The differences are only in frequency spectrum template and LDPC encoding rate in the channel parameters.

TABLE 11

| Related information of the program information list | Value | Description |
|---|---|---|
| Program numbers | 1 | One program on broadcasting |
| The number of broadcasting frequency points for the program | 4 | Four broadcasting frequency points |
| Central frequency of the broadcasting frequency point 1 | 0x8C6180 | Expressing 105 MHz by unit of 10 Hz |
| Relative time delay of the broadcasting frequency point 1 | 0x0 | basis reference, no time delay |
| Channel parameters of the broadcasting frequency point 1 | 0x4140C000 | Transmission mode 1, frequency spectrum template 1, sub-frame distribution method 1, modulation modes of service description information and service information are all QPSK, no hierarchical modulation, equal protection is applied, LDPC encoding rate is 1/2 |
| Central frequency of the broadcasting frequency point 2 | 0x90F560 | Expressing 90 MHz by unit of 10 Hz |
| Relative time delay of the broadcasting frequency point 2 | 0x3E8 | Expressing 0.1 second by units of 100 ns |
| Channel parameters of the broadcasting frequency point 2 | 0x4940C000 | Transmission mode 1, frequency spectrum template 9, sub-frame distribution method 1, modulation modes of service description information and service information are all QPSK, no hierarchical modulation, equal protection is applied, LDPC encoding rate is 1/2 |

TABLE 11-continued

| Related information of the program information list | Value | Description |
|---|---|---|
| Central frequency of the broadcasting frequency point 3 | 0x9402A0 | Expressing 97 MHz by unit of 10 Hz |
| Relative time delay of the broadcasting frequency point 3 | 0x1388 | Expressing 0.5 second by unit of 100 ns |
| Channel parameters of the broadcasting frequency point 3 | 0x4140A000 | Transmission mode 1, frequency spectrum template 9, sub-frame distribution method 1, modulation modes of service description information and service information are all QPSK, no hierarchical modulation, equal protection is applied, LDPC encoding rate is 1/3 |
| Central frequency of the broadcasting frequency point 4 | 0x989680 | Expressing 100 MHz by unit of 10 Hz |
| Relative time delay of the broadcasting frequency point 4 | 0x2170 | Expressing 1 second by unit of 100 ns |
| Channel parameters of the broadcasting frequency point 4 | 0x4940A000 | Transmission mode 1, frequency spectrum template 9, sub-frame distribution method 1, modulation modes of service description information and service information are all QPSK, no hierarchical modulation, equal protection is applied, LDPC encoding rate is 1/3 |

The transmitting end carries out time-delayed transmission according to respective transmission time delays of the frequency points on broadcasting when transmitting the digital broadcasting program on the service carrier frequency. In the present embodiment, the 105 MHz frequency point is set as the time delay reference frequency, the transmission delay time of the 97 MHz carrier frequency is 0.5 second, and the transmission delay time of the 100 MHz carrier frequency is 1.0 second, thus the target delay time should be longer than the largest transmission time delays of the carrier frequencies on broadcasting; assuming that the target delay time is 2.0 second, the receiving end firstly stores the digital broadcasting signals in a buffer when receiving the digital broadcasting program on the current receiving carrier frequency; assuming that the current receiving carrier frequency is the 100 MHz carrier frequency, the buffer compensates the delay time according to the transmission delay time of 1.0 second of the current receiving carrier frequency, i.e. the 100 MHz carrier frequency, adds the delay time by 1.0 second to reach the target delay time 2.0 second; if the receiving end switches from the 100 MHz to the 97 MHz for reception, then the delay time is compensated according to the transmission delay time 0.5 second of the current receiving carrier frequency i.e. the 97 MHz carrier frequency after switching, by adding the delay time by 1.5 second to reach the target delay time 2.0 second. Thus, the time delay of the digital broadcasting signal is equivalent to 2.0 second all the time, thereby achieving that the digital broadcasting program can be continuously and seamlessly broadcasted across different carrier frequencies, and improving the user experience greatly.

In the present invention, a part of the carrier frequencies are set as common carrier frequencies which are utilized to transmit the distribution information of the carrier frequencies of the programs. As all of the common carrier frequencies are combined together to achieve a seamless coverage for the large area, the receiving end can obtain the distribution information of the carrier frequencies of the programs at anywhere within the large area, and can select the carrier frequency with best signal quality to receive the program based on the distribution information of the carrier frequencies, trace the program effectively and automatically transfer across different carrier frequencies as needed to achieve seamless switchover, thereby enlarging the seamless program coverage area from the coverage scale of single carrier frequency to the coverage scale of all the current broadcasting carrier frequencies. Meanwhile, since the above mentioned method only depends on the signal quality to implement network switching, and does not impose more demands on the network synchronization and control command, when constructing a network, it is only required to ensure that the coverage areas covered by the carrier frequencies on which the programs are broadcasted overlap each other, the seamless program coverage can be achieved, and the complexity would be decreased greatly compared to constructing a single frequency network or a multi frequency network. In addition, a large area seamless coverage can be achieved by the present invention based on programs but not the carrier frequency, if the program data rate is smaller than the total data rates that can be transmitted by the carrier frequencies on which the program is broadcasted, the remaining part can be used to transmit other regional programs, thereby the service requirement of the regional broadcasting is satisfied.

The present invention may be a system, a method, and/or a computer program product. The computer program product may include a computer readable storage medium having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Various aspects of the present invention are described herein referring to the method and system according to the embodiments of the present invention. The above description is exemplary but not exhaustive, and further is not limited to the disclosed various embodiments. Many modifications and changes would be obvious for an ordinary person skilled in the art without departing from the scope and the spirit of the described various embodiments. The selection of terms used in the present document aims to best explain the principle, practical usage or technological improvement to the techniques in the market, or aims to enable other ordinary person in the art to interpret various embodiments disclosed in the present document. The scope of the present invention is defined by attached claims.

What is claimed is:

1. A method for implementing a large area continuous coverage of programs in a digital audio broadcasting, comprising:

setting part of carrier frequencies of the digital audio broadcasting as common carrier frequencies and setting the other carrier frequencies as service carrier frequencies, all the common carrier frequencies being combined together to form a seamless coverage of the large area;

transmitting a digital broadcasting signal by a transmitting end, comprising: transmitting a common frequency point identifier and a program information list on the common carrier frequencies and transmitting a digital broadcasting program on the service carrier frequencies; the common frequency point identifier being used to distinguish the common carrier frequencies and the service carrier frequencies, the program information list including all sequence number of the digital broadcasting programs and all frequency points on broadcasting of each digital broadcasting program;

receiving the digital broadcasting signal by a receiving end, comprising: identifying the common carrier frequencies according to the common frequency point identifier and receiving the digital broadcasting signal on the common carrier frequencies; for a specific program desired to receive, searching all the service carrier frequencies which are broadcasting the specific program according to the received program information list, and selecting a service carrier frequency with best signal quality for receiving the specific program, and during the reception process of the specific program, monitoring the signal quality of other service carrier frequencies for which are broadcasting the specific program, and if the signal quality of the current receiving service carrier frequency decreases, switching to another service carrier frequency with better signal quality to continue receiving the specific program.

2. The method according to claim 1, wherein only one carrier frequency is used to completely cover each minimum coverage area within the large area, and this carrier frequency is a common carrier frequency, wherein the minimum coverage area is the coverage area of a single transmission tower.

3. The method according to claim 1, wherein the program information list is transmitted cyclically in a carousel mode on the common carrier frequencies.

4. The method according to claim 1, wherein the program information list is transmitted on a control channel or a service channel of the common carrier frequencies.

5. The method according to claim 1, wherein, if the number of the common carrier frequencies within the large area is more than one, the transmitting end transmits a common carrier frequency position information on each of the common carrier frequencies for indicating other common carrier frequencies to implement that the receiving end can switch over between different common carrier frequencies.

6. The method according to claim 5, wherein the common carrier frequency position information comprises: the number of network frequency points, a central frequency, the number of neighboring networks, the number of neighboring network frequency points and neighboring network central frequencies.

7. The method according to claim 5, wherein the common carrier frequency position information is transmitted cyclically in a carousel mode on the common carrier frequencies.

8. The method according to claim 5, wherein the common carrier frequency position information is transmitted on a control channel or a service channel of the common carrier frequencies.

9. The method according to claim 1, wherein the program information list further comprises a fast access parameter set of each frequency point on broadcasting, the fast access parameter set includes all of or part of system information of the frequency point on broadcasting, and the system information refers to physical layer configuration parameters of the digital broadcasting signal; if the signal quality of the current receiving carrier frequency decreases, the receiving end uses the fast access parameter set to quickly switch over to another carrier frequency with better signal quality to continue receiving the specific program.

10. The method according to claim 9, wherein the bits of the fast access parameter set and the corresponding system information are as follows:

| Bit | System Information |
|---|---|
| $b_0$~$b_1$ | Transmission mode |
| $b_2$~$b_7$ | Frequency spectrum mode index |
| $b_8$~$b_9$ | Sub-frame distribution mode |
| $b_{10}$~$b_{11}$ | Modulation mode of the service description information |
| $b_{12}$~$b_{13}$ | Modulation mode of the service information |
| $b_{14}$~$b_{15}$ | Hierarchical modulation indication of the service data |
| $b_{16}$ | Indication of using equal protection to encode the service data |
| $b_{17}$~$b_{18}$ | LDPC encoding rate of the service data |
| $b_{19}$~$b_{20}$ | LDPC encoding rate of the service data |
| $b_{21}$~$b_{31}$ | Reserved |

$b_0$~$b_1$: transmission mode, 00 is reserved, 01 refers to transmission mode 1, 10 refers to transmission 2, and 11 refers to transmission mode 3;

$b_2$~$b_7$: frequency spectrum mode index;

$b_8$~$b_9$: sub-frame distribution mode; 00 is reserved, 01 refers to sub-frame distribution mode 1, 10 refers to sub-frame distribution mode 2 and 11 refers to sub-frame distribution mode 3;

$b_{10}$~$b_{11}$: modulation mode of the service description information; 00 refers to QPSK, 01 refers to 16 QAM, 10 refers to 64 QAM and 11 is reserved;

$b_{12}$~$b_{13}$: modulation mode of the service data; 00 refers to QPSK, 01 refers to 16 QAM, 10 refers to 64 QAM and 11 is reserved;

$b_{14}$~$b_{15}$: hierarchical modulation indication of the service data; 00 indicates the hierarchical modulation is not supported, 01 indicates the hierarchical modulation is supported and $\alpha$=1, 10 indicates the hierarchical modulation is supported and $\alpha$=2, and 11 indicates the hierarchical modulation is supported and $\alpha$=4;

$b_{16}$: indication of using equal protection to encoding the service data, 0 indicates the equal protection is not applied, and 1 indicates the equal protection is applied;

$b_{17}$~$b_{18}$: LDPC encoding rate of the service data; 00 refers to 1/4 encoding rate, 01 refers to 1/3 encoding rate, 10 refers to 1/2 encoding rate and 11 refers to 3/4 encoding rate;

$b_{19}$~$b_{20}$: LDPC encoding rate of the service data; 00 refers to 1/4 encoding rate, 01 refers to 1/3 encoding rate, 10 refers to 1/2 encoding rate, and 11 refers to 3/4 encoding rate;

wherein, in the case of the non-hierarchical modulation, the encoding rate of the service data, when equal protection is applied, is indicated by $b_{17}$~$b_{18}$, and $b_{19}$~$b_{20}$ are reserved; when unequal protection is applied, the encoding rate of the service data is obtained from the service description information, and $b_{17}$~$b_{20}$ are reserved; in case of the hierarchical modulation, the encoding rate of the service data using high protection is indicated by $b_{17}$~$b_{18}$, and the encoding rate of the service data using low protection is indicated by $b_{19}$~$b_{20}$;

$b_{21}$~$b_{31}$: reserved for future extension use.

11. The method according to claim 1, wherein the common carrier frequency identifier is included in system information of the digital broadcasting signal, and the system information refers to physical layer configuration parameters of the digital broadcasting signal; the system information comprises 48 bits, the bits and the corresponding system information are as follows:

| Bit | System Information |
|---|---|
| $b_0$ | Multi frequency point cooperative working mode indication |
| $b_1$~$b_9$ | Multi frequency point cooperative working frequency point for next sub-frame |
| $b_{10}$~$b_{12}$ | Current sub-band nominal frequency |
| $b_{13}$~$b_{18}$ | Frequency spectrum mode index |
| $b_{19}$~$b_{20}$ | Current physical layer signal frame position |
| $b_{21}$~$b_{22}$ | Current sub-frame positon |
| $b_{23}$~$b_{24}$ | Sub-frame distribution mode |
| $b_{25}$~$b_{26}$ | Modulation mode of the service description information |
| $b_{27}$~$b_{28}$ | Modulation mode of the service data |
| $b_{29}$~$b_{30}$ | Service data hierarchical modulation indication |
| $b_{31}$ | Indication of using equal protection to encode the service data |
| $b_{32}$~$b_{33}$ | LDPC encoding rate of the service data |
| $b_{34}$~$b_{35}$ | LDPC encoding rate of the service data |
| $b_{36}$ | Common frequency point indication |
| $b_{37}$~$b_{41}$ | Reserved |
| $b_{42}$~$b_{47}$ | CRC check digits |

$b_0$: multi frequency point cooperative working mode indication; 0 refers to multi frequency point cooperative working and 1 refers to non-multi frequency point cooperative working;

$b_1$~$b_9$: multi frequency point cooperative working frequency point for next sub-frame; the unsigned integers expressed by $b_1$~$b_9$ are I, the multi frequency point cooperative working frequency point for next sub-frame is (87+0.05I)MHz, and during the non-multi frequency point cooperative working, $b_1$~$b_9$ all are 1;

$b_{10}$~$b_{12}$: current sub-band nominal frequency;

$b_{13}$~$b_{18}$: frequency spectrum mode index;

$b_{19}$~$b_{20}$: the position of the current physical layer signal frame in one super frame; 00 refers to the first frame, 01 refers to the second frame, 10 refers to the third frame and 11 refers to the fourth frame;

$b_{21}$~$b_{22}$: the position of current sub-frame in one physical layer signal frame; 00 refers to the first sub-frame, 01 refers to the second sub-frame, 10 refers to the third sub-frame and 11 refers to the fourth sub-frame;

$b_{23}$~$b_{24}$: sub-frame distribution mode; 00 is reserved, 01 refers to sub-frame distribution mode 1, 10 refers to sub-frame distribution mode 2 and 11 refers to sub-frame distribution mode 3;

$b_{25}$~$b_{26}$: modulation mode of the service description information; 00 refers to QPSK, 01 refers to 16 QAM, 10 refers to 64 QAM and 11 is reserved;

$b_{27}$~$b_{28}$: modulation mode of the service data; 00 refers to QPSK, 01 refers to 16 QAM, 10 refers to 64 QAM and 11 is reserved;

$b_{29}$~$b_{30}$: hierarchical modulation indication of the service data; 00 indicates the hierarchical modulation is not supported, 01 indicates the hierarchical modulation is supported and $\alpha$=1, 10 indicates the hierarchical modulation is supported and $\alpha$=2 and 11 indicates the hierarchical modulation is supported and $\alpha$=4;

$b_{31}$: indication of using equal protection to encode the service data; 0 indicates the equal protection is not applied and 1 indicates the equal protection is applied;

$b_{32}$~$b_{33}$: LDPC encoding rates of the service data; 00 refers to 1/4 encoding rate, 01 refers to 1/3 encoding rate, 10 refers to 1/2 encoding rate and 11 refers to 3/4 encoding rate;

$b_{34}$~$b_{35}$: LDPC encoding rates of the service data; 00 refers to 1/4 encoding rate, 01 refers to 1/3 encoding rate, 10 refers to 1/2 encoding rate and 11 refers to 3/4 encoding rate;

wherein, in case of the non-hierarchical modulation, the encoding rate of the service data, when equal protection is applied, is indicated by $b_{32}$~$b_{33}$, and $b_{34}$~$b_{35}$ are reserved; when unequal protection is applied, the encoding rate of the service data is obtained from the service description information, and $b_{32}$~$b_{35}$ are reserved; in case of the hierarchical modulation, the encoding rate of the service data using high protection is indicated by $b_{32}$~$b_{33}$, and the encoding rate of the service data using low protection is indicated by $b_{34}$~$b_{35}$;

$b_{36}$: common frequency point indication; 0 refers to service frequency point, 1 refers to common frequency point and is a common frequency point identifier;

$b_{37}$~$b_{41}$: reserved for future extension use;

$b_{42}$~$b_{47}$: CRC check digits.

12. The method according to claim 1, wherein the transmitting end implements time-delayed transmission based on the transmission time delays of respective frequency points on broadcasting when transmitting the digital broadcasting program on the service carrier frequencies; the program information list further includes transmission time delays of each frequency point on broadcasting of all the digital broadcasting programs;

when receiving the digital broadcasting program, the receiving end firstly stores the digital broadcasting program in a buffer, compensates the time delay to achieve a target delay time based on the transmission time delay of the current receiving carrier frequency and then broadcasts the program, achieving that the digital broadcasting program can be seamlessly and continuously broadcasted across different carrier frequencies.

13. A system for implementing a large area continuous coverage of a program in a digital audio broadcasting, comprising:

a transmitting end that sets part of carrier frequencies of the digital audio broadcasting as common carrier frequencies and sets other carrier frequencies as service frequencies, all of the common carrier frequencies being combined together to form a seamless coverage for the large area; and transmits a digital broadcasting signal, comprising: transmitting a common frequency point identifier and a program information list on the common carrier frequencies and transmitting a digital broadcasting program on the service carrier frequencies; wherein the common frequency point identifier is used to distinguish the common carrier frequencies and the service carrier frequencies, and the program information list comprises all sequence numbers of the digital broadcasting programs and all frequency points on broadcasting for each digital broadcasting program;

a receiving end that receives the digital broadcasting signal, comprising: identifying the common carrier frequencies based on the common frequency point identifier and receiving the digital broadcasting signal on the common carrier frequencies; for a specific program desired to receive, searching all the service carrier frequencies which are broadcasting the specific program according to the received program information list and selecting to receive a service carrier frequency with best signal quality for receiving the specific program, during the reception process of the specific program, monitoring the signal quality of other service carrier frequencies which are broadcasting the specific program, and switching to another service carrier frequency with better signal quality to continue receiving the specific program if the signal quality of the current receiving service carrier frequency decreases.

14. The system according to claim 13, wherein only one carrier frequency is used to completely cover each minimum coverage area within the large area, and this carrier frequency is a common carrier frequency, wherein the minimum coverage area is the coverage area of a single transmission tower.

15. The system according to claim 13, wherein, if the number of the common carrier frequencies within the large area is more than one, the transmitting end transmits a common carrier frequency position information on each common carrier frequency to indicate other common carrier frequencies for implementing that the receiving end can switch over between different common carrier frequencies.

16. The system according to claim 15, wherein the common carrier frequency position information comprises: the number of network frequency points, a central frequency, the number of neighboring networks, the number of neighboring network frequency points and the neighboring network central frequency.

17. The system according to claim 13, wherein the program information list further comprises a fast access parameter set of each frequency point on broadcasting, the fast access parameter set includes all of or part of a system information of the frequency point on broadcasting, and the system information refers to physical layer configuration parameters of the digital broadcasting signal; if the signal quality of the current receiving carrier frequency decreases, the receiving end uses the fast access parameter set to quickly switch to another carrier frequency with better signal quality to continue receiving the specific program.

18. The system according to claim 13, wherein the transmitting end implements time-delayed transmission based on the transmission time delays of respective frequency points on broadcasting when transmitting the digital broadcasting program on the service carrier frequency; the program information list further includes transmission time delays of each frequency point on broadcasting of all the digital broadcasting programs;

the receiving end, when receiving the digital broadcasting program, firstly stores the digital broadcasting program in a buffer, compensates the time delay to achieve a target delay time based on the transmission time delays of the current receiving carrier frequency and then broadcasts the program, implementing that the digital broadcasting program can be seamlessly and continuously broadcasted over different carrier frequencies.

* * * * *